Oct. 10, 1967   T. E. FIDDLER   3,345,899
SYNTHETIC RESIN FASTENERS
Filed Nov. 4, 1964   2 Sheets-Sheet 1

INVENTOR
THEODORE E. FIDDLER

BY
ATTORNEY

Oct. 10, 1967 T. E. FIDDLER 3,345,899
SYNTHETIC RESIN FASTENERS
Filed Nov. 4, 1964 2 Sheets-Sheet 2
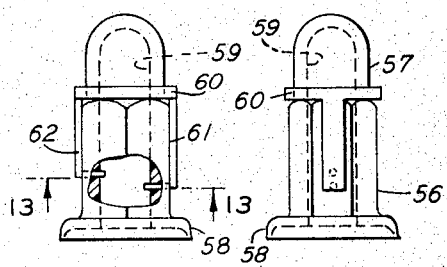
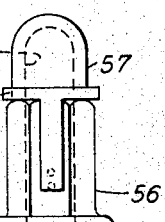
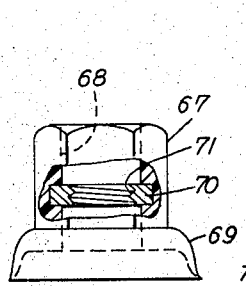
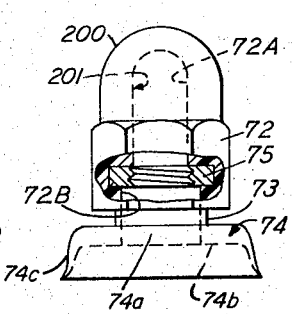
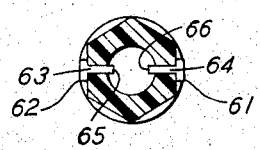
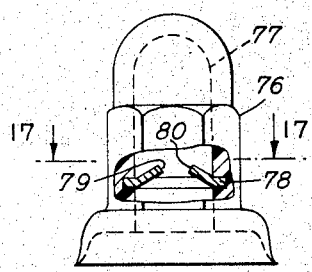
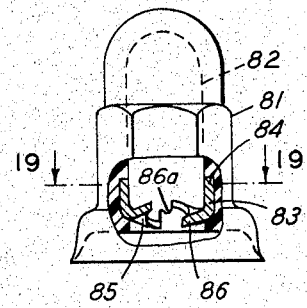
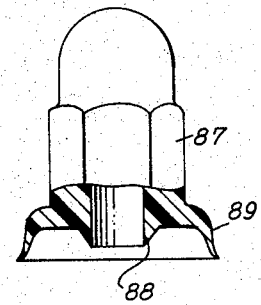
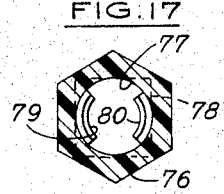
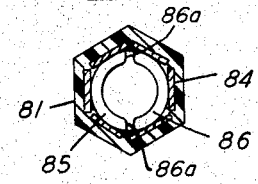
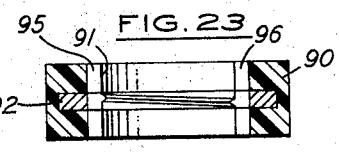
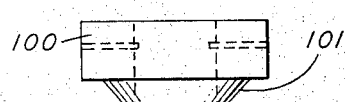
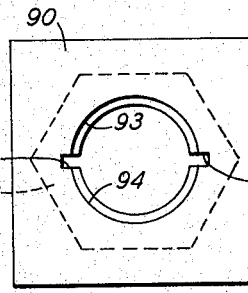
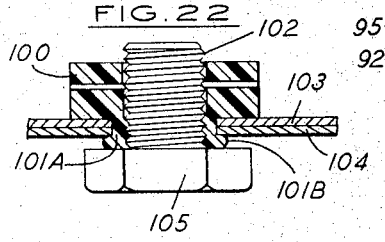
INVENTOR
THEODORE E. FIDDLER
BY
ATTORNEY

United States Patent Office 3,345,899
Patented Oct. 10, 1967

3,345,899
SYNTHETIC RESIN FASTENERS
Theodore E. Fiddler, 1200 Cedar Drive,
Birmingham, Mich. 48009
Filed Nov. 4, 1964, Ser. No. 408,995
2 Claims. (Cl. 85—32)

This invention relates to fasteners and in particular to molded nut bodies made of synthetic resin material having metal insert thread members and to attaching means such as bolts, studs, and cross-heads suitable for use with the novel nuts.

The devices of the invention provide fastening and attaching means which are not subject to the usual causes of decomposition such as rusting, oxidation, and electrolysis in the presence of moisture, salts and acids. The devices themselves constitute insulating members relative to metal items which they inter-connect especially where electrolysis is a factor in the decomposition of the metal parts, the fastening means, and the attaching means.

The mounting of metal trim moldings to metal panels in automobiles, appliances, and other items is a suitable example of an environment illustrating the utility of the invention. However, the invention is not limited to such use and environment.

In such assemblies, the panel on which the molding is mounted may be ferrous metal and it may be suitably protectively and decoratively coated. The molding may be ferrous metal, white metal, stainless steel, aluminum, etc. The molding may be plated with nickel, chromium, etc. In the prior art the studs or bolts may be ferrous, white metal, and may be coated with zinc, cadmium or other metals and the nuts or fasteners may be ferrous metal, white metal, aluminum, etc. and they also may be coated with zinc, cadmium or other metals.

When the molding, panel, studs or bolts, and nuts or fasteners of the prior art are assembled they form a group of many unlike metals which in the presence of moisture, salt, acid, etc., set up electrolysis which rapidly removes the protective coatings from the parts. This leaves the parts unprotected and direct rust, and oxidation then takes place while electrolysis continues. This results in the rapid decomposition of all parts.

Automobile bodies and trim provide an aggravated example of this decomposition especially where the roads are salted in winter, where gravel roads are dust-treated with hygroscopic salt material, in salt-air at sea coasts, and in industrial areas having airborne salts and acids. These examples provide aggravated conditions, but even in their absence, the presence of moisture in the presence of unlike metals causes decomposition at a rapid rate.

With the foregoing in view, it is a primary object of the invention to provide a non-metallic attaching means and non-metallic fastener means for moldings, panels, and other parts to neutralize aggravated decomposition of the attaching and fastener means and to neutralize aggravated decomposition of the panels, moldings, and other parts themselves adjacent the fastening and attaching means.

An object of the invention is to provide fastening and attaching means which do not increase the decomposition rate of panels and moldings adjacent the fastening and attaching means.

An object of the invention is to provide nonmetallic attaching means of fiber glass or other synthetic materials having relatively inflexible portions for attachment and relatively flexible portions for positioning and holding the attaching portion relative to the molding prior to mounting and fastening the molding on a member.

An object of the invention is to provide nonmetallic fastener bodies of synthetic resin, fiber glass, etc. having enclosed metal thread members.

An object of the invention is to provide molded nut bodies having internal annular walls on the small diameter of the metal insert thread, on the large diameter of the metal insert thread, on a larger diameter than the large diameter of the thread of the metal insert singly and in combination as desired to provide for desired torque characteristics.

An object of the invention is to provide relief grooves in the nut body such as in the location of the interruption in a thread member of the metal insert for providing material flow space and easy internal wall extension characteristics in the nut body.

An object of the invention is to provide novel fasteners such as nuts having nonmetallic bodies equipped with imbedded thread cutting and/or thread engaging metal inserts.

An object of the invention is to provide a molded nut body and a metal thread insert with the insert being molded in the body, heat staked in the body after the body is molded, inserted in the body after the body is molded, driven into the body after the body is molded, and/or swaged in the body after the body is molded.

An object of the invention is to provide a nonmetallic nut body with a metal thread member insert which is simple in design and construction, easy to use, which threads on a bolt or stud with low torque, and which locks on a bolt or stud with high reverse torque.

An object of the invention is to provide a nonmetallic nut body which surrounds and protects the metal thread engaging or thread forming insert to prevent decomposition of the metal insert.

An object of the invention is to provide novel metal inserts in a novel nonmetal nut body in a novel combination which may cut threads on a stud or follow threads on a bolt of metal or nonmetallic material.

These and other objects of the invention will become apparent by reference to the following description of the novel attachment and fastener means embodying the invention taken in connection with the accompanying drawing in which:

FIG. 11 is a side elevational view of a nut, partly in cross-section, showing a modification of the invention and showing round or annular metal inserts attached to a supporting and positioning cage member and showing internal nut walls in dotted lines.

FIG. 12 is a side-elevational view of the device seen in FIG. 11 taken at a right angle to the showing of FIG. 11 showing the collar and leg of the cage in more detail.

FIG. 13 is a cross-sectional view of FIG. 11 taken on the line 13—13 thereof showing the structure of the legs and projecting inserts in more detail.

FIG. 14 is a side elevational view, partly in cross-section, of a modified nut of the invention showing a metal insert having a helical thread and a sealing flange formed integral with the nut body.

FIG. 15 is a side elevational view, partly in cross-section, of a device similar to that seen in FIG. 14, with the body being connected to the sealing flange by a thin wall frangible annular web adapted to sever when the nut is run on a bolt or stud permitting the sealing flange to act as a rotationally stationary washer after separation.

FIG. 16 is a side elevational view, partly in cross-section, of a modified nut of the invention similar to FIGS. 14 and 15, showing a spring-finger thread, engaging metal insert permitting the nut to be pushed on a bolt or stud.

FIG. 17 is a cross-sectional view of FIG. 16 taken on the line 16—16 thereof showing the staking of the metal insert in the nut body.

FIG. 18 is a side elevational view, partly in cross-section, showing metal thread members supported on supporting tab members.

FIG. 19 is a cross-sectional view of FIG. 18 taken on the line 19—19 thereof showing the staking of the metal insert and tab members in the nut body.

FIG. 20 is a side elevational view partly in cross-section of a nut having an axially projecting frusto-conical hollow boss for centering the nut relative to an aperture and for sealing relative to an aperture.

FIG. 21 is a side elevational view of a flat nut having a frusto-conical hollow boss for centering, sealing, and interconnecting with workpieces when assembled.

FIG. 22 is a cross-sectional view of the nut of FIG. 21 having a hollow frusto-conical boss showing the nut in assembled condition with workpieces and a bolt and illustrating the sealing, centering, and interlocking characteristics.

Figure 1:
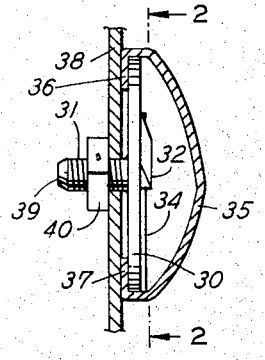
FIG. 1 is a cross-sectional view of a panel and molding with the attaching means and fastener means of the invention securing the molding and panel together showing a cross-plate having a stud and a nut threaded on the stud.
Figure 2:
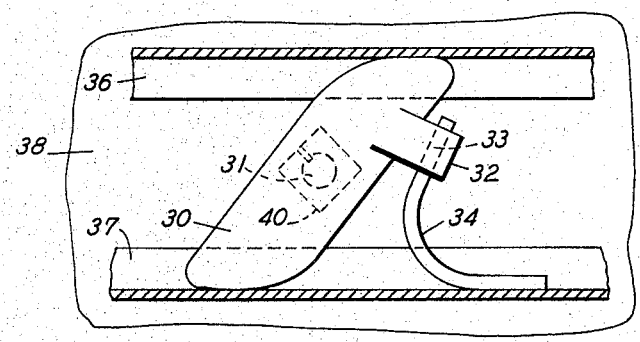
FIG. 2 is a cross-sectional view of the assembly shown in FIG. 1 such as taken on the line 2—2 thereof.
Figure 3:
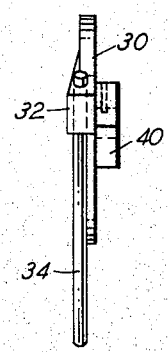
FIG. 3 is a side elevational view of a modified attaching and fastener means as seen in FIGS. 1 and 2 showing a cross plate having a nut.
Figure 4:
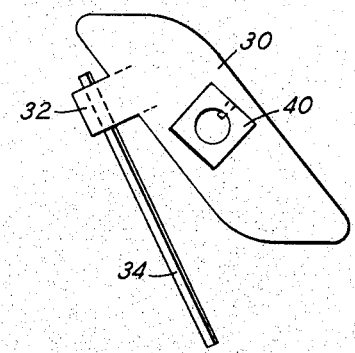
FIG. 4 is a face elevational view of the attaching means and nut fastener means seen in FIG. 3.
Figure 5:
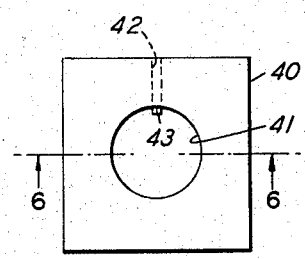
FIG. 5 is an enlarged plan view of the nut of FIGS. 1–4 showing the embedded portion of the thread forming or engaging metal insert in dotted lines and showing the thread forming end edge or engaging projecting portion in solid lines.

FIG. 23 is a composite view of a stud and a nut showing the stud in elevation and the nut in cross-section wherein the metal insert has a helical thread for cutting threads, wherein the unthreaded stud has a frusto-conical nose portion to provide a lead relative to the nut, and wherein axial slots interrupt the body, insert, and thread; and FIG. 24 is a plan view of the nut seen in FIG. 23 showing the metal insert in dotted lines and showing the relief slots.

Referring now to the drawings wherein like numerals refer to like and corresponding parts throughout the several views, the novel attaching and fastener devices disclosed therein are preferably made of non-metallic materials such as compositions generally known as "plastics." These materials include fiber glass, thermosetting resins, and thermoplostic resins of various types, strength, and characteristics. These materials are insulators rather than conductors of an electrical current. Thus in any electric situation the part formed of this material interrupts the flow of current and thus insulates the adjacent metal parts. This interrupts the electrolytic action. Also, these materials are not subject to the type of decomposition usually found in metals such as rusting of ferrous metals and the oxidation of aluminum, zinc, titanium, etc. These plastics materials also eliminate the presence of several types of unlike metals in the combination of panels, moldings, attaching means, and fasteners. This reduces the potential of the association of unlike metals.

While plastics materials have found their way into industrial use on a wide scale, their use as nuts or other fastening means has not proven entirely successful due to the fact that they do not have sufficient resistance to shear stresses to provide sufficient strength in relatively small portions such as in threads.

The devices of the invention overcome this limitation of the plastics materials by using metal inserts of suitable quality and shear strength. Thus the novel nuts of the invention possess all the advantages of the plastics materials as far as resistance to decomposition is concerned and also embody the advantages of metal thread members for cutting threads on unthreaded studs or for following threads on threaded bolt portions with suitable shear strength to provide adequate torque characteristics.

The invention also provides the combination of at least two types of plastics materials wherein one type is relatively rigid and the other type is relatively flexible. These relatively rigid and flexible materials may be used and interconnected in parts so that the relatively rigid portion provides the desired structural strength and wherein the relatively flexible portion provides the spring-like characteristic needed such as for holding attaching means in position in moldings.

The nonmetallic nut bodies and the metal thread inserts of the invention are conducive to many kinds of structural integration and methods of manufacturing and assembly. The bodies may be molded with the inserts in them. The bodies may be molded separately of the inserts and have a receiving channel, cavity, or socket for the insert and the inserts then positioned and secured such as by jamming and/or staking. The body may be molded and the insert driven through the molded body. The inserts may be supported on a cage and the cage in turn supported on the nut body.

The various methods of manufacture and assembly allow various internal molded constructions and designs of the nut bodies not otherwise possible. The various methods of manufacture and assembly also provide for using several types or kinds or inserts with a single type nut body or with many types and kinds of nut bodies. This reduces mold costs as the different combinations would otherwise require different molds.

More particularly, the combination of components shown in FIGS. 1–6 illustrate an example and use of the novel attaching means and fastening means of the invention. The cross-plate 30 has a stud 31 and a shoulder 32. The shoulder has an aperture or opening 33. The cross-plate 30, stud 31, shoulder 32, and aperture 33 may be molded out of fiber glass, thermoplastic resin, or thermosetting resin. The foregoing parts are made of relatively rigid material. An arm 34 of relatively flexible synthetic resin material is inserted in the aperture 33 of the shoulder 32. The flexibility of the arm 34 gives it spring-like characteristics. When bent from the position of the arm 34 seen in FIGS. 3 and 4 to the position seen in FIGS. 1 and 2, the flexible arm 34 is spring loaded and exerts a rotating or turning influence on the cross-plate 30 to hold it in position relative to the molding 35 which locks the cross-plate 30 behind a flange 36 and a flange 37 on a molding 35.

The arm 34 and cross-plate 30 or other member may be interconnected in any suitable manner. They may be molded together if desired or mechanical securing means employed.

After the cross-plate 30 is secured relative to the molding 35, the stud 31 is inserted through an opening in a panel 38. In this connection, the stud 31 may have a nose 39 which is reduced in cross-section axially outwardly of the stud providing a lead portion on the stud for a self-threading nut.

A nut 40, FIGS. 1-6, has a central aperture formed by an interior wall 41 of suitable or desired shape. The nut may be any shape. A metal insert 42 leads through the body of the nut 40 and has an end projecting beyond the annular interior wall 41 of the nut body 40. The projecting end 43 of the metal insert 42 constitutes the thread engaging portion or the thread cutting portion of the nut 40. The projecting end of the insert acts as the thread portion of the nut.

Figure 6:
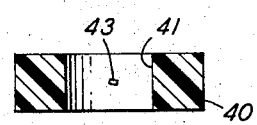
FIG. 6 is a cross-sectional view of the device of FIG. 5 taken on the line 6—6 thereof showing the projecting end of the metal insert in end elevation illustrating its rectangular cross-section and showing its side-to-side axis located on a helix angle.

It will be noted that the insert 42 may be somewhat rectangular in cross-section and is positioned with its lateral axis on an angle relative to the transverse plane of the body of the nut 40, FIG. 6. This may be considered the helix angle of the projecting groove in an unthreaded steel stud and the nut advances axially upon rotation down the steel shank and it torques up with good effect on both an unthreaded steel shank and a threaded steel shank.

In this connection, it has been found that the nut 40 runs on a threaded or unthreaded shank or stud with low torque. This provides fast acting attaching means without the danger of twisting off a stud. In other words, the novel nut of the invention has been found to run on easily and to provide a very high torque resistance to loosening and reverse rotation.

The plate 30 may have the metal insert 42 imbedded directly in its body and the nut 40 embossment thereon deleted entirely. Thus the plate 30 with an aperture and a metal insert 42 constitutes a nut in itself. The nut 40 embossment on the plate 30 is shown to graphically illustrate the nut characteristics of the plate 30.

Figure 7:
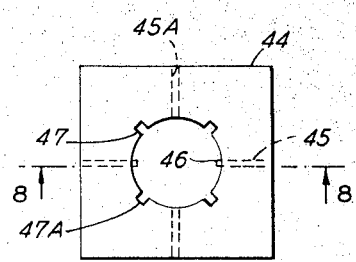
FIG. 7 is a view of a nut, similar to FIG. 5, showing four thread forming or engaging metal inserts.
Figure 8:
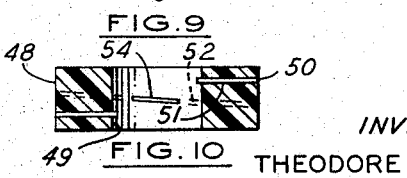
FIG. 8 is a side view of the device seen in FIG. 7, partly in cross-section and partly in elevation showing the metal inserts in more detail illustrating their helix angle disposition and their axial spacing and location.

More than one metal insert may be used with the nut of the invention, FIGS. 7 and 8. A nut 44 may have two metal inserts 45 having projecting ends 46 extending past an internal wall 47 of the nut 44 and two metal inserts 45A with ends at the internal wall. The inserts 45 and 45A are disposed on the same helix angle and are staggered in position axially and angularly. The helix angle of the inserts 45 and 45A and the axial and angular spacing of the inserts of the nut 44 may be such that the inserts cut and ride one thread on a bolt or stud. However, they may be so disposed axially and angularly that they will cut or follow several threads employed with a plastic nut as desired and the disclosure of one metal insert such end 43 thread portion of the nut 40. The helix angle of the nut therefore may be established by the inclination of the side-to-side axis of the metal insert 42.

When the nut 40 is advanced on the stud 31, the outer periphery of the stud 31 lies closely adjacent the internal wall 41 of the nut 40. This aligns the nut on the stud. The leap end of the nose portion 39 of the stud 31 extends past the projecting end 43 of the insert 42. In this way the projecting end 43 of the insert 42 engages the sloping portion of the nose 39. Upon rotation of the nut 40 relative to the stud 31, the projecting end 43 of the metal insert 42 cuts a thread on the stud according to the angle of the helix upon which the lateral axis of the insert 42 is disposed.

When a threaded bolt is used in conjunction with the nut and metal thread insert, it may be advantageous to have the metal insert cross-sectional axis lying at or near the helix angle of the thread on the bolt, however, it has been found that a metal insert disposed on zero helix angle relative to the nut will follow a helical thread on the bolt.

It has been found that the plastic nut with the metal insert as shown in FIGS. 1-6, may be run on unthreaded studs of white metal. These may be found in automobile decorative trim items like the monograms and letters on the front and rear portions of cars. The projecting end 43 of the metal insert 42 cuts a thread in the white metal employed in such items. It has also been found that the projecting end 43 of the metal insert 42 will cut a spiral as seen in FIGS. 1-6, and the disclosure of four metal inserts seen in FIGS. 7 and 8 are exemplary. Obviously various pluralities of inserts may be so employed.

A nut body, such as the nut body 44, FIGS. 7 and 8, may have axial slots 47A. The slots 47A provide space to allow flow of the material of the nut body to permit radial expansion of the internal wall 47. In this connection it will be noted that the metal inserts 45A do not have projecting ends 46 but rather ends lying at the internal wall 47 in its unexpanded condition. Upon running the nut body 44 on a stud or bolt, the internal wall is expanded and the end of the insert 45A caused to project upon the internal wall 47 expanding radially outwardly.

Figure 9:
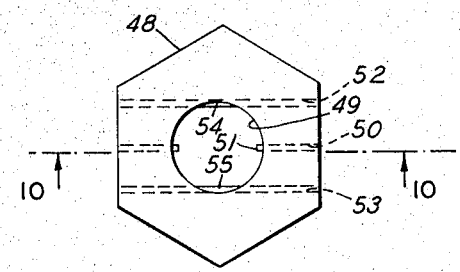
FIG. 9 is a plan view of a nut having two metal inserts as shown in FIGS. 1–8 having projecting ends and also showing two metal inserts positioned tangentially relative to a bolt or stud having projecting sides for engaging a thread on a bolt or for rolling a thread on a stud.
Figure 10:
FIG. 10 is a cross-sectional view of FIG. 9 taken on the line 10—10 thereof showing the helical angulation of the metal inserts and their axial position and spacing.

Referring now to the modified nut of the invention seen in FIGS. 9 and 10, the nut 48 has an internal wall 49. Metal inserts 50 have projecting ends 51 extending past the internal wall 49 of the nut 48. These inserts may be similar to those previously described in connection with FIGS. 1-8. A pair of tangential inserts 52 and 53 are located in the body of the nut 48 and have a projecting side edge 54 and 55 respectively extending pas the internal wall 49 of the nut 48. The projecting side edges 54 and 55 respectively of the tangential inserts 52 and 53 extend past the tangent point of the internal wall 49 and the tangent point external periphery of a stud. The tangential inserts 52 and 53 may be positioned on a helix angle as seen in FIG. 10. The tangential inserts 52 and 53 may be used within the concept of the invention without other metal inserts. In other words they may be used alone and constitute thread forming means in the nut 48 for forming a thread on a stud such as the stud 31. They also constitute thread engaging means and may follow the thread on a threaded bolt portion. The tangential inserts 52 and 53 are shown disposed on a desired thread helix angle to be formed on an unthreaded bolt or stud and/or coordinated with the helix angle of a threaded bolt portion. When used in conjunction with the thread cutting inserts such as the insert 50, the tangential inserts 52 and 53 may be positioned in the nut to ride in the threads formed in the stud, or follow in the threads of the bolt on the same helix angle as the inserts 50. It is obvious that in an embodiment like the device of FIGS. 9 and 10 that the helix angle and the angular and axial positioning of the inserts 50, 52, and 53 are such that the inserts may ride in the same thread or in several threads as desired. The tangential inserts 52 and 53 at zero helix angle will thread on a bolt and follow and lock relative to threads formed by other inserts.

The thread tangential inserts 52 and 53 have been found particularly advantageous in forming threads on studs made of thermoplastic material as this material deforms readily in conjunction with the rotation of the nut 48 so that the nut 48 is readily threaded on a stud. The use of the thread forming inserts 50 in conjunction with the tangential inserts 52 and 53 is also found advantageous in conjunction with white metal and steel studs. Here the thread forming inserts 50 form a thread groove in the stud which is followed by the tangential inserts 52 and 53. The tangential inserts 52 and 53 side engaging portions 54 and 55 respectively are supported at the opposite side and at either end by the portion of the insert embodied in the nut body. Thus this nut may be torqued substantially higher, support greater loads, and provides means for strengthening the thread engagement between the nut and the stud or threaded bolt portions.

The bodies of the nuts 40, 44, and 48 may be molded with the metal inserts 42, 45, 50, 54, and 55 in place. Also the nuts may be molded and the inserts then driven into the nut bodies. Suitable channels may be formed in the nut bodies to receive the inserts when the bodies are molded. Also, the nut bodies may be molded without channels and the inserts driven into the body. Channels or apertures may also be pierced in a body and the insert then embedded. The inserts may be provided with barbs preventing their movement radially outwardly of the nut aperture to provide added means securing the insert end projecting past the nut internal wall in the extended condition. However, it has been found that the inserts as shown maintain their thread engaging condition. Supporting tabs and crowns may be used on the inserts for reinforcing the inserts and/or interconnecting with the nut body with augmented mechanical interlock.

In this connection, when a nut runner tool surrounds the nut, the driving walls of the nut runner tool engage the outer ends of the metal inserts and prevent their moving radially outwardly. Once the nut is run on the stud or bolt, the jammed condition of the various parts maintains the locked up condition.

Referring now to the modification of the device seen in FIGS. 11–13, a cap nut 56 made of plastics material is shown. The cap nut 56 has a reduced dome portion 57 and enlarged sealing flange 58. The nut 56 also has a hollow interior defined by the interior wall 59. A cage collar 60 fits over the nut dome 57. Depending legs 61 and 62 respectively extend radially inwardly of the nut 56. The prongs are shown round but may be any shape. The prongs 63 and 64 terminate radially inwardly of the nut 56 in projecting ends 65 and 66 respectively. The prongs 63 and 64 are the thread forming and/or thread engaging metal inserts. Their inner ends constitute the thread members of the nut.

In the nut of FIGS. 11–13, the body may be molded and the cage formed separately. The cage and body are then assembled. The internal wall 59 lies on a larger diameter than the maximum thread projection of the metal inserts. This provides clearance within the head as desired. Cages having different type thread members may be placed on the type nut body and vice versa. The cage may be used with the ordinary nut and this is part of the concept of the invention. When a nut runner or wrench is placed over the inserts, the action holds the inserts radially inwardly in engagement with a stud or bolt.

The collar 60, legs 61 and 62, prongs 63 and 64, and the projecting ends 65 and 66 are stamped and formed from sheet metal. The projecting ends 65 and 66 may be disposed on a helical angle relative to the internal wall 59 of the nut 56. They may be disposed at different axial positions as illustrated. When disposed at different axial and angular positions on the same helix they may ride in the same thread. When disposed opposite one another they may be employed to form or ride in two threads of stud or bolt portion. Obviously the helix angle and the axial and angular position of the projecting ends 65 and 66 of the device seen in FIGS. 11–13 may be so coordinated to produce the result desired by a person utilizing the invention. A cage may have a single leg and insert or a desired plurality of legs and inserts.

Referring now to the device of FIG. 14 it will be noted that a nut 67 has an interior wall 68 and a spring flange 69. A metal insert 70 is embedded in the nut body 67 and preferably has an angular external periphery preventing relative rotation between the nut 67 and insert 70 by structural shape abutment. Obviously other mechanical abutments may be used such as projections, barbs, or prongs as desired. The metal insert 70 has an aperture defined by a threaded internal periphery 71. The threaded periphery may be of the conventional type or of the interrupted thread cutting type as desired.

Clearance space radially outwardly of the thread root is shown, however the internal wall 68 of the nut 67 may be any shape and/or molded on any diameter or two diameters providing clearing and jamming relationships. Here the insert is illustrated as being molded in the nut but it may be designed and engineered for heat staking as set forth herein relative to other embodiments.

The nut shown in FIG. 15 includes a plastic body having a dome 200 at its upper end and having a longitudinal bore 201 extending through the interior of the body and opening out of the lower end of the body. A radially enlarged central portion 72 is molded integrally with the lower end of the dome and is formed with angularly spaced flats for engagement with a tool (not shown) for rotating the nut. A metal insert member 75 is embedded within the central portion 72 and may be of the type shown in FIG. 14 or any of the other types of inserts illustrated and described. An insert similar to that shown in FIGS. 18 and 19, has been found to be particularly suitable for use in the nut of FIG. 15. In running this nut on a threaded bolt or an unthreaded stud, the insert 75 threads on the bolt or stud.

It will be seen that the nut of FIG. 15 has a thin-walled annular web 73 defining the minimum cross-sectional area of the nut and interconnecting a sealing or spring flange 74 with the central portion 72 of the nut. In this instance, the spring flange 74 includes a base 74a extending radially outwardly of the central portion 72 and having a flat bottom surface 74b disposed normal to the axis of the bore 201. The flange further includes a thin-walled skirt 74c extending downwardly from the base 74a and tapered outwardly for sealing engagement with the panel, molding or workpiece.

As the insert 75 and the nut threads on the bolt or stud, the skirt 74c of the spring or sealing flange 74 comes in contact with the panel, molding, fabric, or other workpiece. Upon the skirt engaging the surface of the workpiece on a greater radius that the thin wall interconnecting frangible web 73, the skirt frictionally engages the surface of the workpiece and stops rotating, whereupon with further rotation of the nut, the thin wall web 73 is ruptured and the central body portion 72 then advances with further rotation into contact with the base 74a of the flange 74, the flange 74 remaining rotationally stationary. This provides a spring or sealing flange 74 of nonrotational washer characteristics relative to a workpiece in conjunction with the rotational characteristics of the nut. This may be found to be especially useful in securing fabrics or sheets to supports. This also provides sealing means at regular or irregular workpiece surfaces and involves lock-washer action.

The flexibility of the depending skirt 74c permits the skirt to conform to irregularities in the surface of a workpiece and/or seal thereagainst with the flange 74 rotationally stationary. Workpiece surface irregularities also assist in stopping flange 74 rotation and in rupturing the frangible thin wall web 73.

In the nut of FIG. 15, the internal wall 72A in the dome 200 is on a small diameter and the internal wall 72B in the flange 74 and the central portion 72 is on a large diameter. Thus a bolt will clear the wall 72B and jam against the wall 72A. Such relationships are found advantageous under some conditions. These characteristics are applicable to the other embodiment of nut bodies.

The cap nut 76, FIGS. 16 and 17, has an internal wall 77 and a metal insert 78. The metal insert 78 has spring fingers 79 and 80. The nut 76 of FIG. 16 may be pushed axially on a threaded bolt or a stud and the spring fingers 79 and 80 permit the passing of the bolt threads or stud surface in the one axial direction of moving the nut 76 on a stud or bolt. However, the angulation of the spring fingers 79 and 80 prevent the reverse axial movement of the nut relative to the stud or bolt thereby fixedly connecting the nut and bolt together. The internal wall 77 of the nut 76 is on two diameters, FIG. 17, with one diameter at the edges of the spring fingers 79 and 80 and the other larger diameter lying at the base or root of the fingers 79 and 80.

In the modified device seen in FIGS. 18 and 19, the nut 81 has an internal wall 82 and a metal insert 83. The insert 83 has an annular supporting collar or tabs 84. The collar or tabs 84 may lie on the plane of the internal wall 82 or be slightly radially inwardly positioned therefrom. The collar or tabs 84 support radially inwardly extending thread engaging projections 85 and 86. The projections 85 and 86 may be semicircular and disposed on a helical angle as illustrated. The projections 85 and 86 may be thread forming and/or thread following as desired and designed in the construction of the insert. The projections 85 and 86 may lie in the same axial plane as shown or may lie in different planes as illustrated in other embodiments. Moreover, the projections may be interrupted by axially extending grooves 86a diametrically spaced from each other and providing flow space into which plastic or metal may flow while the nut is being threaded and jammed onto the stud.

While the metal inserts of FIGS. 16–19 are shown as heat staked in the nut bodies, they also may be molded therein. In some of the devices as illustrated the nut bodies are molded with insert receiving sockets. The inserts are then placed in the sockets and a portion of the nut body heat staked over the insert. The structural shape of the inserts and the sockets prevents relative rotation therebetween. Any number of inserts or thread members may be used.

FIG. 20 shows a cap nut 87 having a hollow frusto-conical boss portion 88. A sealing or spring flange 89 may surround the boss portion 88. The flange 89 may be frangibly connected if desired. The frusto-conical boss portion 88 provides means for leading into an aperture of a panel or other workpiece. In this way the boss portion 88 establishes the nut 87 axially centrally of the aperture in the panel or workpiece. Obviously, the boss portion 88 can be incorporated with any of the other plastic body nuts disclosed and described and obviously various types of metal projections can be integrated with the body of the nut 87 as previously shown and described. The boss portion also seals at the aperture. Upon the boss portion being extruded through an aperture, it forms an interlocking sealing sleeve and also an interlocking sealing flange.

The sealing or spring flanges of the devices of FIGS. 11–20 provide means for not only sealing against a workpiece but also maintaining a spring tensioned engagement with the workpiece.

FIG. 21 shows a flat square nut 100 of thermoplastic material having a hollow frusto-conical boss 101 prior to use in an assembly. FIG. 22 shows the nut of FIG. 21 in the assembled condition with a bolt 102 workpieces such as panels 103 and 104. It is to be noted that the boss 101 is deformed from its original shape of FIG. 21, to the shape of a sleeve 101A and a flange 101B illustrated in FIG. 22 when the nut 100 is rotated or spun on the bolt 102 against the workpieces 103 and 104. As illustrated, the formed sleeve 101A lines and centers the apertures of the workpieces 103 and 104 and also seals them. The formed flange 101B spreads out behind the workpiece 104 and locks against its surface. Thus the nut 100 abuts the workpiece 104 and the sleeve 101A interconnects the nut 100 and flange 101B. This attaches the workpieces 103 and 104 together, centers their apertures relative to one another, and seals the workpieces at their surfaces and within their apertures. A head 105 on the bolt 102 is shown abutting the formed flange 101B. This further locks up the assembly, however it has been found that the flange 101B forms as shown without being abutted by the head 105 of the bolt 102 and effects an interlock when the bolt 102 and/or head 105 are removed.

Referring now to the nut structure seen in FIGS. 23 and 24, it will be noted that a nut 90 has a plastic body, and internal wall 91, and a metal insert 92. The insert 92 may have an angular external periphery such as hexagonal as indicated by the dotted lines of FIG. 24. The thread portions 93 and 94 may be interrupted by the slots 95 and 96. The thread portions 93 and 94 may be so axially positioned and helically angled that they may form and ride in the same thread or form and ride in different threads. An unthreaded stud 97 may have a reduced nose portion 98. The external periphery of the stud 97 may closely approximate the dimension of the internal wall 91 of the nut 90. In attaching or threading the nut 90 on the stud 97, the internal wall 91 is fitted over the outer periphery of the stud 97. This places the reduced leading end of the nose portion 98 of the stud within the threads 93 and 94 of the metal insert 92. Upon rotation of the nut relative to the stud 97 the leading edges of the threads 93 and 94 at the slots 95 and 96 bite into the material of the stud 97. This takes place gradually from the reduced nose portion 98 to the full peripheral section of the stud as shown. The internal wall 91 of the nut fits relatively closely adjacent the external periphery of the stud 97 and this positions the nut axially relative to the stud so that the nut 90 threads on the stud 97 on the helix of the threads 93 and 94. The slots 95 and 96 lie in the body of the nut 90. The slots 95 and 96 in the body of the nut 90 provide flow space for the body material under jamming conditions between the nut and stud. This feature may be used with any nut body.

While nuts of various shapes, style, and size have been shown in conjunction with various metal inserts of various kinds, sizes, positions, and conformations, it will be understood that any one of the metal inserts shown and described can be used and employed with any one of the various nuts shown and described as well as nuts of other shapes and sizes. It will also be understood that the frusto-conical boss portion 88 or 101 may be employed on any type of nut regardless of its shape, conformation, and size and that a spring or sealing flange may be used or deleted where desired. It is also within the perview of the invention to use a frangible thin-wall inter-connecting web between a sealing flange and a nut regardless of the shape, size, or conformation of the nut. Thus any one metal insert may be used with any nut.

Thus the invention is not limited to the specific illustrated combinations as it is believed unnecessary to illustrate and describe the numerous combinations which are obvious. It is believed obvious that the cage collar, legs, and prongs of the device of FIGS. 11, 12, and 13 can be used with any other type of nut such as a square nut or a hex nut of the open variety. In this connection a cage having an annular opening axially of the nut aperture may be superposed on a nut face with the legs depending over the nut sides holding the metal prong inserts internally of the nut.

While studs have been shown having a leading reduced nose portion to illustrate a preferred embodiment of the invention, it has been found practical to thread any of the metal inserts shown and described on studs that have a cylindrical conformation without a leading nose portion. Relative to the threaded bolt portion, any of the thread inserts of the nut of the invention readily follow the thread and make a high torque lock-up with the bolt portion.

The novel nut combination of a body of plastics material and a metal thread or thread forming insert is not limited to any particular type or shape of body or insert. The metal insert may be a regularly tapped nut, a formed piece of sheet metal, a tapped, or a swaged nut. The metal inserts may be adapted to form or engage single and multiple threads.

Although the preferred embodiments of the invention together with a few modifications have been shown and described in detail, it is obvious that many changes and modifications may be made in the size, shape, detail, arrangement, and combination of the various elements of the invention within the scope of the appended claims:

I claim.

1. A nut for use with a stud having a predetermined major diameter, said nut comprising a body of plastic material, a dome on the upper end of said body covering an interior bore extending longitudinally and centrally through the interior of said body and opening out of the lower end of the body, a radially enlarged, central portion on said body integrally connected to said dome and extending toward the lower end of the body and having a plurality of flats on its exterior surface for engagement with a tool, a substantially cylindrical radially larger than said central portion having the flats and extending longitudinally from the latter toward the lower end of the body, a flat surface on the bottom of said base radially larger than said central portion and being normal to the axis of said bore, a thin walled skirt extending downwardly from the peripheral edge of said base and tapered outwardly for sealing against a member secured between said base and the head of the stud, an interior cylindrical wall in said base forming a portion of said bore and having a diameter larger than said major diameter and adapted to guide said stud upwardly through said base and into said bore, a metal member embedded in the central portion of the nut body, a thread engaging part in said metal member projecting generally towards the axis of the bore, said metal member having axially extending grooves in said metal member interrupting the thread engaging part, and an interior annular wall in said dome of a diameter less than the major diameter of the stud to jam on a stud threaded through said metal member and into said dome.

2. A nut for use with a stud having a predetermined major diameter, said nut comprising a body of plastic material, a dome on one end of said body covering an interior bore extending longitudinally and centrally through the interior of said body to an open end at the opposite end of the body, a radially enlarged, central portion on said body integrally connected to said dome and extending toward the opposite end of the body and having a plurality of flats on its exterior surface for engagement with a tool, a base extending radially outwardly from said central portion of said body having the flats and extending longitudinally from the latter toward the opposite end of the body, a flat surface on the bottom of said base extending radially outward from said bore and being normal to the axis of said bore, a thin walled skirt extending downwardly from said base and tapered outwardly for sealing against a member secured between said base and the head of the stud, an interior cylindrical wall in said base forming a portion of said bore and having a diameter larger than said major diameter and adapted to guide said stud upwardly through said base and into said bore, a metal member embedded in the central portion of the nut body, a thread engaging part in said metal member projecting generally towards the axis of the bore, said metal member having axially extending grooves in said metal member interrupting the thread engaging part, an interior annular wall in said dome of a diameter less than the major diameter of the stud to jam on a stud threaded through said metal member and into said dome, and a thin walled web defining the minimum cross-sectional area of said body and formed integrally between said base and said central portion of the body carrying said metal member for rupturing to disconnected said base from this portion whereby said base and skirt function as a washer for the relatively rotatable central portion of the nut containing the metal member.

References Cited

UNITED STATES PATENTS

| | | | |
|---|---|---|---|
| 2,380,994 | 8/1945 | Pummill | 151—19 |
| 2,393,323 | 1/1946 | Hungerford et al. | 151—7 |
| 2,417,262 | 3/1947 | Morehouse | 85—36 |
| 2,538,483 | 1/1951 | Summers | 85—35 |
| 2,561,036 | 7/1951 | Sodders | 85—36 |
| 2,573,498 | 10/1951 | Scott | 85—82 |
| 2,832,391 | 4/1958 | Clark | 151—7 |
| 2,850,064 | 9/1958 | Rapata | 151—7 |
| 2,896,495 | 7/1959 | Crawford | 85—32 |
| 2,904,820 | 9/1959 | Flora | 151—7 |
| 3,000,066 | 9/1961 | Cochran | 24—73 |
| 3,110,069 | 11/1963 | Jones | 24—73 |

FOREIGN PATENTS 883,340   11/1961   Great Britain.

CARL W. TOMLIN, Primary Examiner.

R. S. BRITTS, Assistant Examiner.